United States Patent
Funger et al.

(10) Patent No.: US 6,336,803 B1
(45) Date of Patent: Jan. 8, 2002

(54) APPARATUS FOR TREATING A TEXTILE WEB WITH ULTRASOUND

(75) Inventors: Bernhard Funger, Krefeld; Peter Hader, Kempen; Klaus Kubik, Tönisvorst, all of (DE)

(73) Assignee: Eduard Kusters Maschinenfabrik GmbH & Co. KG, Krefeld (DE)

(*) Notice: Subject to any disclaimer, the term of this patent is extended or adjusted under 35 U.S.C. 154(b) by 0 days.

(21) Appl. No.: 09/275,341

(22) Filed: Mar. 24, 1999

(30) Foreign Application Priority Data

Mar. 25, 1998 (DE) .......................... 198 13 121

(51) Int. Cl.$^7$ .............................................. B29C 65/08
(52) U.S. Cl. .................... 425/141; 425/150; 425/174.2; 156/580.2
(58) Field of Search ................. 425/135, 141, 425/150, 174.2, 445; 156/73.1, 73.4, 580.1, 580.2

(56) References Cited

U.S. PATENT DOCUMENTS

| | | | | |
|---|---|---|---|---|
| 3,612,385 A | * | 10/1971 | Humpage | 228/1.1 |
| 3,910,263 A | * | 10/1975 | Wallander | 128/75 |
| 4,047,992 A | * | 9/1977 | Williams et al. | 156/73.1 |
| 4,673,067 A | * | 6/1987 | Munning et al. | 188/299 |
| 4,842,671 A | * | 6/1989 | Nuss | 156/433 |
| 4,995,938 A | * | 2/1991 | Tsutsumi | 156/580 |
| 5,749,987 A | * | 5/1998 | Wannebo | 156/64 |
| 5,765,817 A | * | 6/1998 | Breitbach | 267/136 |
| 5,840,154 A | * | 11/1998 | Wittmaier | 156/580.2 |
| 6,004,427 A | * | 12/1999 | Kohn | 156/580.2 |
| 6,190,296 B1 | * | 2/2001 | Gnad et al. | 493/8 |

FOREIGN PATENT DOCUMENTS

| | | |
|---|---|---|
| DE | 43 25 143 | 12/1994 |
| DE | 195 13 246 | 4/1996 |
| DE | 195 13 246 C2 | 4/1996 |
| DE | 195 26 354 | 1/1997 |

OTHER PUBLICATIONS

Tönshoff, et al., "Piezo–Aktuatoren für den mm–Bereich" (Piezo actuators for the mm range), VDI–Z Special Antriebstechnik, pp. 48–58 (Apr. 1994).*

* cited by examiner

Primary Examiner—Nam Nguyen
Assistant Examiner—Donald Heckenberg
(74) Attorney, Agent, or Firm—Kenyon & Kenyon

(57) ABSTRACT

A device for treating a continuously advancing material web with ultrasound includes an ultrasound generator and a sonotrode, rigidly connected with the former in a manner so as to transmit ultrasound. The sonotrode has a face which lies opposite a counter-tool. The material web is passed through the gap. The module composed of the ultrasound generator and the sonotrode is connected with the machine frame via a piezoelectric actuator, by means of which small displacements of the face of the sonotrode relative to the circumference surface of the counter-roller can be balanced out.

14 Claims, 2 Drawing Sheets

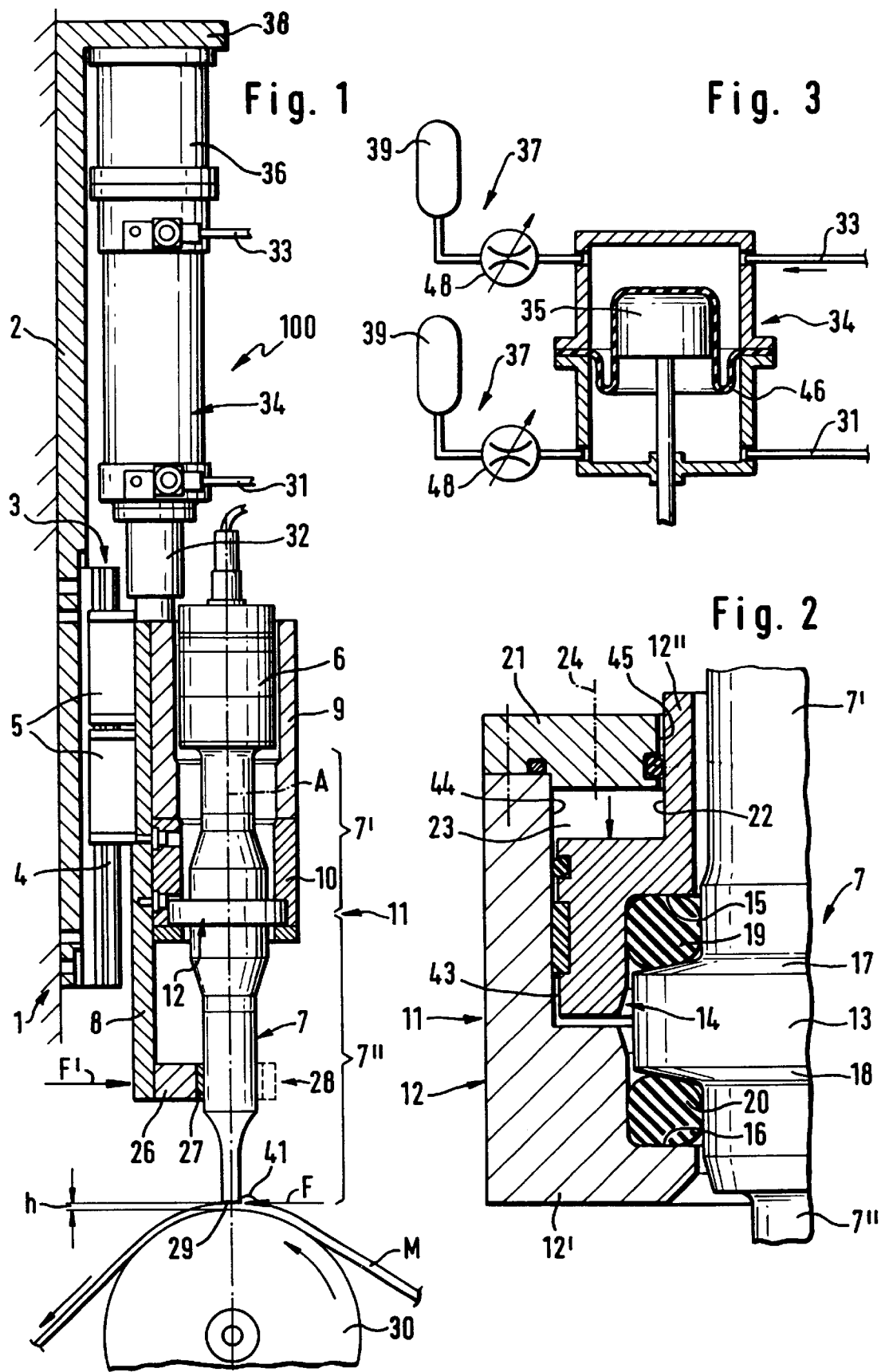

APPARATUS FOR TREATING A TEXTILE WEB WITH ULTRASOUND

BACKGROUND OF THE INVENTION

The present invention relates to a device for treating a continuously advancing material web via an ultrasound generator having a sonotrode, including a counter-tool which lies opposite the face of the sonotrode. The material web passes through a gap between the sonotrode and the counter-tool. A drive sets the sonotrode against the counter-tool.

This general type of device is described in German Patent 195 26 354 C1. The treatment includes, for example, bonding of a non-woven made of thermoplastic fibers, by bonding the fibers at certain points. In order to achieve an optimum treatment effect, the distance between the sonotrode and the counter-tool, i.e. the sheath surface of the relief which is applied to it, in some instances, must be very accurately maintained. For this reason, a sensor is provided in known devices, which detects the height of the gap between the sonotrode and the counter-tool, and the signal of which is used to regulate the distance. Precise and reliable detection of the gap height is a difficult process, however, and requires a complicated measurement device.

Maintaining a certain gap height must be done in such a precise way because temperature variations at the sonotrode and the accompanying thermal expansions play a significant role. For this reason, the device according to German Patent 195 13 246 C2 includes a sensor which detects the temperature of the sonotrode, the signal of which is used to influence the gap height. However, only one partial aspect of the variable which changes the gap height is detected in this manner, i.e. only the temperature-related displacements.

Other important changes which influence the gap height in operation and occur with greater frequency result from concentricity defects of the counter-roller that generally forms the counter-tool, as well as irregularities of the material web itself.

SUMMARY OF THE INVENTION

The present invention is based on the task of improving adherence to a uniform treatment effect.

The present invention provides an apparatus for treating a continuously advancing material web via an ultrasound generator having a sonotrode, including a counter-tool which lies opposite the face of the sonotrode. The material web passes through a gap between the sonotrode and the counter-tool. A drive sets the sonotrode against the counter-tool. Additionally, means are provided for suppressing the effect of vibrations at the sonotrode on the treatment of the material web.

The invention is also directed to the problem of minimizing the irregularities with greater frequency, which are attributable to vibrations in the ultrasound treatment system. Such vibration-related irregularities can come about by excitation of many different types, for example as a result of the movements of the counter-roller, as mentioned, due to concentricity defects, of entraining effects of the material web which act on the face of the sonotrode, crosswise to it, as bending stress, etc.

Accordingly, implementation of the principle of the invention has different aspects.

One important aspect is to prevent the vibrations excited by impacts of the textile web on the sonotrode from occurring in the first place. This concern is addressed by an additional aspect of the invention, in which the sonotrode is supported, in its vibration direction, via a high-frequency actuator, which is activated by a control which reacts to measured changes in the force or the distance between the face of the sonotrode and the counter-tool. The high-frequency actuator serves to prevent changes in the distance between the face of the sonotrode and the counter-roller, to a certain extent, by retracting the sonotrode in timely manner, for example, if the counter-roller is demonstrating eccentricity, so that no sudden compression of the material web occurs and this reason for vibrations is therefore avoided. This involves not only eccentric counter-rollers, but also irregularities in the web, for example.

The actuator must be able to react very quickly, in accordance with the speed of the occurrence of such changes in distance between the sonotrode face and the counter-roller. A piston/cylinder unit activated with a liquid pressure medium is not capable of this.

For this reason, the high-frequency actuator is also provided in addition to such a piston/cylinder unit which might be present and has the task of bringing about the larger setting movements of the sonotrode.

Possible high-frequency actuators are piezoelectric or magnetostrictive actuators, which can perform the strokes in the millisecond or microsecond range which is in question here. Piezoelectric actuators have been described in the essay "Piezo-Aktuatoren für den mm-Bereich" [piezo actuators for the mm range] by Tonshoff and Laux in the VDI-Z Special Antriebstechnik [special issue of the journal of the Society of German Engineers, concerning drive technology], April 1994, pages 48 to 52, and in an application example in German Patent 43 25 143. Magnetostrictive actuators have already been proposed to control the nozzle needle in injection valves, in German Patent PS 695 974. The contents of these references are hereby incorporated by reference for these teachings.

If the drive of the sonotrode includes a piston/cylinder unit to press the sonotrode against the counter-tool, i.e. the counter-roller, another measure to suppress vibrations can be to damp them by throttling, i.e. to place throttles in the feed lines to the two cylinder chambers, which throttle the flow of the pressure medium.

In order not to have to overcome break-away forces in the piston/cylinder unit, it is recommended to seal it not with piston rings or the like, but rather with a roll membrane.

In known embodiments, the sonotrode is surrounded, on its circumference, by a bearing unit which engages at the location of a vibration node, seen in the axial direction of the sonotrode. Either the sonotrode has a circumference flange and the bearing unit has an inside circumference groove, into which the circumference flange engages, or vice versa. In either case, elastic rings are provided between the flanks of the circumference flange and the circumference groove, which are supposed to damp the coupling between the sonotrode and the bearing unit in the axial direction and reduce the transfer of ultrasonic vibrations in this direction to the bearing construction.

However, these elastic intermediate elements themselves normally promote the formation of vibrations. In order to be able to bring about an adaptation of the vibration behavior, it is recommended, according to a further embodiment of this invention, to make the axial prestress force of the rings adjustable. One way of doing this is for a hydraulic or pneumatic piston/cylinder unit to be provided, by means of which the rings can be pressed together axially.

The sonotrode projects freely downward from the clamping location, against the counter-roller or the counter-tool.

The material web moves crosswise to the sonotrode, which rests against the material web with a certain force. This results in an entrainment tendency of the material web, which can give rise to bending vibrations of the projecting end of the sonotrode.

For this reason, it is recommended that the sonotrode be supported near its face without impairing the mobility of the sonotrode in its axial direction.

Finally, the tendency toward vibration at the sonotrode can also be reduced in that it does not have a face located parallel to the material web, so that the material web runs up against the edge of the face, but rather the face of the sonotrode is open, in wedge shape, relative to the incoming material web, so that in a way, a constantly narrowing intake mouth is formed.

BRIEF DESCRIPTION OF THE DRAWINGS

FIG. 1 shows a side view of an embodiment of the device constructed according to the principles of the invention, as a partial cross-sectional view;

FIG. 2 shows an enlarged view of the clamping region of the sonotrode;

FIG. 3 shows a schematic view of an embodiment of the piston/cylinder unit for adjusting the sonotrode;

DETAILED DESCRIPTION

Figure 4:
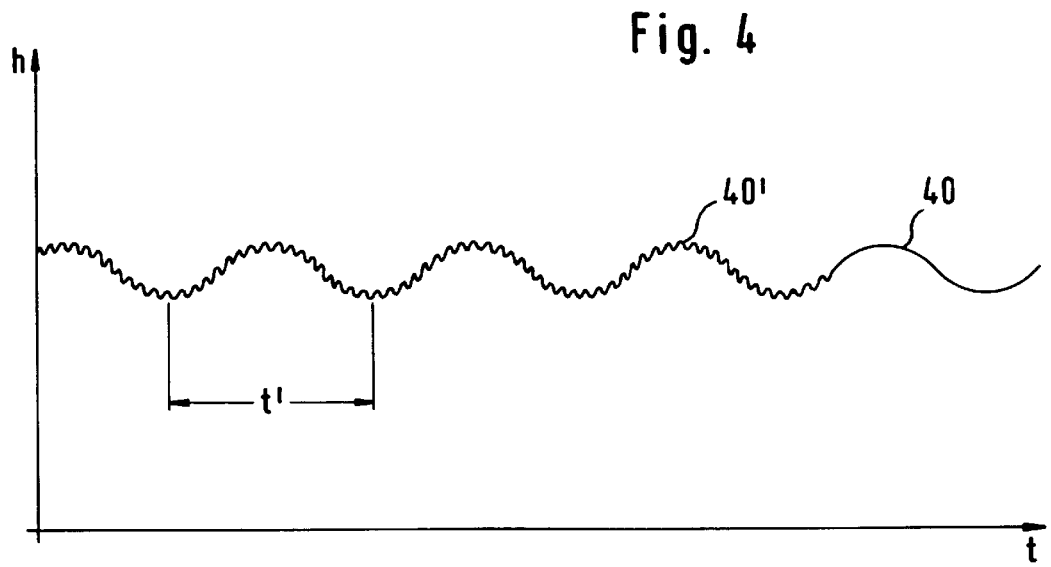
FIG. 4 shows a graph of vibrations in the gap to be countered.

The device designated as a whole as 100 in FIG. 1 serves to bond a material web M made of a non-woven material of thermoplastic fibers. Device 100 includes a vertical bearing plate 2 attached to machine frame 1, on which a vertical straight-line motion guide 3 with rails 4, attached to bearing plate 2, and straight-line motion elements 5 which interact with them are provided; ultrasound generation device 6 and sonotrode 7 are attached to these elements so that they can be moved vertically. Straight-line motion elements 5 engage with a vertical supporting plate 8, on which pipe-shaped housing segments 9, 10 to house ultrasound generator 6, i.e. the upper part of the sonotrode, are located. Ultrasound generator 6 and sonotrode 7 are only connected at one point 11 with housings 9, 10, where a vibration node is located. In this region, a bearing ring designated as a whole as 12 is provided; it is fixed in place radially and, in particular, axially at the bottom end of housing 10.

Holder ring 12 is shown in longitudinal cross-section in FIG. 2, in a plane passing through the axis of sonotrode 7. Sonotrode 7 has a segment 7' which lies above the vibration node at 11, and a segment 7' which lies below the vibration node. In the region of the vibration node at 11, sonotrode 7 possesses a circumference flange 13. Holder ring 12 surrounds sonotrode 7 in the region of circumference flange 13, and possesses an inside circumference groove 14 at this level, into which circumference flange 13 engages radially. Axially directed flanks 15, 16 of inside circumference groove 14 do not rest against corresponding flanks 17, 18 of circumference flange 13, but rather are separated from them by elastic rings 19, 20, which ensure that the component made up of ultrasound generator 6 and sonotrode 7 is supported in housing 10 with a damping effect, so that the axial vibrations of sonotrode 7 are only transferred to housing 10 to a reduced degree.

The vibration coupling formed by rings 19, 20 can be influenced in accordance with the prestress force to which rings 19, 20 are exposed. This is done, in the embodiment according to FIG. 2, by a hydraulic or pneumatic piston/cylinder unit. The hydraulic or pneumatic piston/cylinder unit has a holder ring 12 that is made up of two parts 12' and 12", where part 12", which has an approximately Z-shaped cross-section, is guided in part 12', which forms a cylinder 44, like a piston, with "bottom surface" 43 of the "Z." In other words, the two parts can shift axially relative to one another. Each of parts 12', 12" possesses an inner shoulder on which flanks 15, 16 to press rings 19, 20 together are formed. The shoulders together form inside circumference groove 14. On the top face of part 12', a ring-shaped lid 21 is attached, forming a seal, and extending with its inside circumference 45 to in front of cylinder surface 22, which is concentric with axis A of sonotrode 7, of part 12", which is approximately Z-shaped in cross-section, and sealed relative to this surface by a seal 46. In this manner, a ring-shaped cylinder space 23 is formed between parts 12' and 12" of holder ring 12, which space can be filled with pressure fluid via a feed line 24, which is only indicated. This makes it possible to press the two parts 12', 12" together, where the elastic rings 19, 20 are variably prestressed, depending on the pressure force. This makes it possible to influence the coupling of sonotrode 7 with housing 10 and the vibration behavior of sonotrode 7 to a certain degree.

Supporting plate 8 projects downward beyond holder ring 12 for quite a distance, and possesses a supporting block 26 directed toward sonotrode 7, against which sonotrode 7 rests on one side, via a slide piece 27. Supporting block 26 holds the sonotrode as far down as is possible with the design. It lies in the region of another vibration node 28, which is adjacent to working face 29 of the sonotrode.

This face 29 lies opposite a counter-tool in the form of a rotating counter-roller 30, at a slight distance from it. Counter-roller 30 bears a relief, and its pattern determines the bonding pattern.

Material web M, which can be made up of the aforementioned non-woven of thermoplastic fibers, is passed through between face 29 of sonotrode 7 and the circumference of counter-roller 30. Because of the high-frequency compressions which the material experiences between the peaks of the relief of counter-roller 30 and face 29 of sonotrode 7, local temperature increases occur, up to softening of the thermoplastic fibers. If only bonding of a non-woven is involved, heating must be metered in such a way that the fibers just melt together, but breaks in the material are avoided. If the energy input via sonotrode 7 is controlled appropriately, however, such breaks can also be produced intentionally, i.e. perforation or cutting can also take place according to the process. The energy input to which a certain location of the material web is exposed for the short time during which it passes by the gap between sonotrode 7 and counter-roller 30, is therefore very important for the treatment effect. This energy input depends on the force prevailing in the gap, between face 29 of sonotrode 7 and counter-roller 30. It is plausible that the effects of the ultrasound vibrations will become all the more noticeable, the more material web M is compressed in the gap.

Supporting plate 8, which carries ultrasound generator 6 and sonotrode 7, can be vertically moved along straight-line motion guide 3. It is held vertically via a load cell 32 of a piston/cylinder unit 34, which is supplied with a fluid medium via feed lines 31, 33, and which in turn sits on a piezoelectric actuator 36, which is attached to a bracket 38 of bearing plate 2 at its upper end. This connection is the only connection between parts 8, 32, 34, 36 and bearing plate 2.

Load cell 32 measures the force with which sonotrode 7 is pressed onto material web M in the gap between face 29 of sonotrode 7 and counter-roller 30, and serves to control this force. Piston/cylinder unit 34 serves to perform setting movements. To avoid stick/slip effects, piston 35 of piston/cylinder unit 34 can be sealed with a roll membrane 46, as indicated schematically in FIG. 3. In addition, piston/cylinder unit 34 can having damping elements 37, each with a throttle 48 and a storage reservoir 39, assigned to it, in order to prevent axis-parallel vibrations from being formed by impacts on the sonotrode.

The changes in force measured by load cell 32 in the gap at face 29 of the sonotrode are an indication for the fact that this gap is too narrow or too wide. The measured changes in force can be used to control piezoelectric actuator 36, which represents a setting element with relatively high frequency, which can bring about displacements on the order of the required hundredths or several tenths of millimeters in very short setting times. In this manner, the gap at face 29 can be kept constant at a height h, and therefore the effect on material web M can also be kept constant.

The gap height can become greater and smaller, periodically, for example due to a concentricity defect of counter-roller 30, as is evident from FIG. 4. Wavelength t' corresponds to one rotation of counter-roller 30. The time progression of gap height h is reproduced by curve 40, to the extent that it is attributable to the concentricity defect. Uniform wave movement 40 due to the concentricity defect has higher-frequency disturbances, which result from irregularities in the thickness and compressibility of incoming material web M, superimposed on it. The resulting actual curve 40' can be at least partly eliminated using piezoelectric actuator 36. Using the actuator, it is also possible to apply an interference or counter-frequency that neutralizes the entire system in terms of vibration technology.

As shown in exaggerated manner in FIG. 1, a type of bead 41 forms at the edge of face 29 on the intake side, causing a force F in the direction of movement of material web M on the front end of sonotrode 7, perpendicular to it. This force F is to be balanced out by counter-force F' at supporting point 26, so that no bending vibrations of the freely projecting end of sonotrode 7 will occur.

However, force F can also be reduced by a suitable design of the front end of sonotrode 7.

Figure 5A:
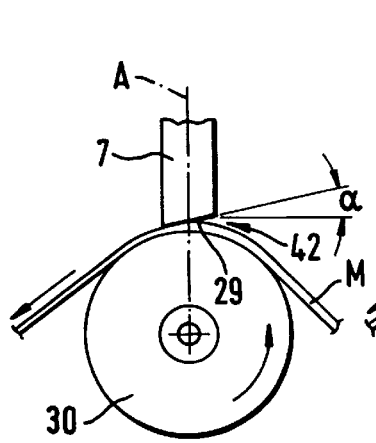
FIG. 5a–5c shows alternative embodiments of the wedge-shaped open arrangement of the face of the sonotrode.
Figure 5B:
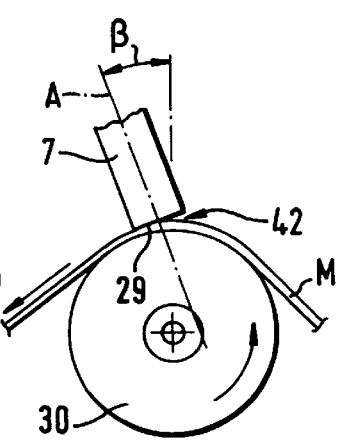
Figure 5C:
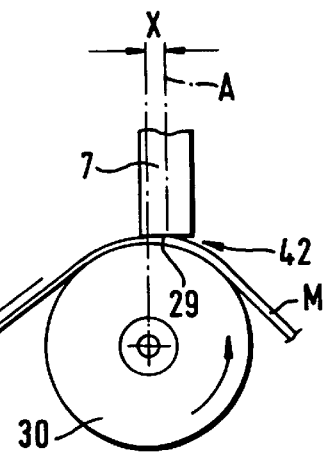

As shown in FIG. 5a, face 29 of sonotrode 7 is slanted to open up toward incoming material web M, at an angle α relative to the horizontal, so that a wedge-like intake mouth 42 is formed. The effect can also be achieved if, in accordance with FIG. 5b, axis A of the sonotrode does not pass through the axis of counter-roller 30, but rather stands at a slant at face 29, which is perpendicular to axis A, at an angle β relative to the vertical. Here again, an open intake mouth 42 is formed, which prevents the formation of beads 41 as in FIG. 1. In the embodiment according to FIG. 5c, intake mouth 42 is also formed, in that sonotrode 7 is offset by the amount X, relative to incoming material web M, from the plane which passes through the axis of counter-roller 30. Here again, an intake mouth which is able to prevent beads 41 that promote lateral forces, according to FIG. 1, is formed.

What is claimed is:

1. A device for treating a continuously advancing material web comprising:
   an ultrasound generator;
   a sonotrode connected to the ultrasound generator, the sonotrode generator having a working face, the sonotrode defining a vibration direction;
   a counter-tool which lies opposite the working face of the sonotrode and defines a gap therebetween;
   means for passing the material web through the gap between the sonotrode and the counter-tool;
   a drive to set the sonotrode against the counter-tool; and
   means for suppressing the effect of vibrations at the sonotrode on the treatment of the material web, said means for supressing including a high-frequency actuator supporting the sonotrode in the vibration direction, wherein the high-frequency actuator is activated by a control which reacts to measured chances in the force or the distance between the face of the sonotrode and the counter-tool.

2. The device according to claim 1, wherein the actuator is a piezoelectric actuator.

3. The device according to claim 1, wherein the actuator is a magnetostrictive actuator.

4. The device according to claim 1, wherein the drive includes a hydraulic piston/cylinder unit, which is damped by damping units with throttles and pressure reservoirs.

5. The device according to claim 4, wherein the piston of the piston/cylinder unit is sealed by a roll membrane.

6. The device according to claim 1, wherein the sonotrode has a circumferential flange arranged in the region of a vibration node which interacts with a circumferential groove or a circumferential flange of a holder ring which surrounds the sonotrode, via elastic rings arranged between flanks of the circumferential groove and flanks of the circumferential flange, and the rings have a level of axial prestress force that is adjustable.

7. A device for treating a continuously advancing material web comprising:
   an ultrasound generator;
   a sonotrode connected to the ultrasound generator, the sonotrode having a working face, the sonotrode defining a vibration direction, the sonotrode having a circumferential flange arranged in the region of a vibration node which interacts with a circumferential groove or a circumferential flange of a holder ring which surrounds the sonotrode, via elastic rings arranged between flanks of the circumferential groove and flanks of the circumferential flange, and the rings have a level of axial prestress force that is adjustable;
   a counter-tool which lies opposite the working face of the sonotrode and defines a gap therebetween;
   means for passing the material web through the gap between the sonotrode and the counter-tool;
   a drive to set the sonotrode against the counter-tool; and
   means for suppressing the effect of vibrations at the sonotrode on the treatment of the material web, said means for suppressing including a high-frequency actuator supporting the sonotrode in the vibration direction,
   wherein a hydraulic or pneumatic piston/cylinder unit is provided, and wherein the piston/cylinder unit is adapted to cooperate with the rings so that the rings can be pressed together axially with the hydraulic or pneumatic piston/cylinder unit.

8. The device according to claim 1, wherein the sonotrode, viewed axially, is additionally supported counter to the direction of movement of the material web, without impairing the mobility of the sonotrode perpendicular to the material web, adjacent to its face, against the advancing direction of the material web.

9. The device according to claim 1, wherein the face of the sonotrode is open in wedge shape relative to the incoming material web, in the gap between the face and the counter-tool.

10. The device according to claim 6, further comprising means for pressing the rings together axially.

11. A device for treating a continuously advancing material web, comprising:

- an ultrasound generator with a sonotrode, the sonotrode having an end face; the sonotrode having circumferential flange arranged on the sonotrode in the area of a vibrational node;
- a counter-tool positioned opposite the end face of the sonotrode to form a gap, the material web passing through the gap;
- a holder ring with a circumferential groove;
- elastic rings arranged in the circumferential groove in the holder ring so that the elastic rings are located between flanks of the circumferential groove in the holder ring and the circumferential flange;
- an actuator for adjusting the sonotrode with respect to the counter-tool; and
- a hydraulic or pneumatic piston/cylinder unit, wherein the rings are adapted to be axially compressed together by the hydraulic or pneumatic piston/cylinder unit to adjust the axial prestress force of the elastic rings.

12. The device according to claim 11, wherein the holder ring has a first part and a second part, the first part having a first inner shoulder forming a first flank of the circumferential groove, the second part having a second inner shoulder forming a second flank of the circumferential groove, the second part being guided in a cylinder formed by the first part, and wherein an end face of the second part opposite to the edge is under hydraulic or pneumatic pressure.

13. The device according to claim 12, wherein the second part has an approximately Z-shaped cross-section, and one of the sides of the "Z" forms an outer cylindrical surface concentric to the axis of the sonotrode, and wherein a ring-shaped cover is attached tightly to the upper end face of the part, the inner circumference of the cover extending up to the cylindrical surface and forming a seal with the cylindrical surface so that a cylinder chamber is formed, the cylinder adapted to be filled with hydraulic fluid or compressed air via a feed line.

14. A device for treating a continuously advancing material web, comprising:

- an ultrasound generator with a sonotrode, the sonotrode having an end face; the sonotrode having circumferential flange arranged on the sonotrode in the area of a vibrational node;
- a counter-tool positioned opposite the end face of the sonotrode to form a gap, the material web passing through the gap;
- a holder ring with a circumferential groove;
- elastic rings arranged in the circumferential groove in the holder ring so that the elastic rings are located between flanks of the circumferential groove in the holder ring and the circumferential flange, the axial prestress force of the elastic rings being adjustable;
- an actuator for adjusting the sonotrode with respect to the counter-tool; and
- a hydraulic or pneumatic piston/cylinder unit engaged with the elastic rings,
    wherein the elastic rings are compressed together by the hydraulic or pneumatic piston/cylinder unit so that the axial prestress force of the elastic rings is adjustable.

* * * * *